United States Patent
Chamberlain et al.

(10) Patent No.: US 11,295,058 B2
(45) Date of Patent: *Apr. 5, 2022

(54) VARIABLE FORMATTING OF VALUES

(71) Applicant: Microsoft Technology Licensing, LLC, Redmond, WA (US)

(72) Inventors: Benjamin C. Chamberlain, Redmond, WA (US); Bruce C. Jones, Bellevue, WA (US); Christopher M. Street, Redmond, WA (US); David F. Gainer, Redmond, WA (US); Eric B. Vigesaa, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 630 days.

This patent is subject to a terminal disclaimer.

(21) Appl. No.: 15/221,934

(22) Filed: Jul. 28, 2016

(65) Prior Publication Data

US 2016/0335226 A1    Nov. 17, 2016

Related U.S. Application Data

(63) Continuation of application No. 13/595,791, filed on Aug. 27, 2012, now Pat. No. 9,424,235, which is a
(Continued)

(51) Int. Cl.
*G06F 40/103* (2020.01)
*G06F 40/18* (2020.01)
(Continued)

(52) U.S. Cl.
CPC .......... *G06F 40/103* (2020.01); *G06F 3/0482* (2013.01); *G06F 3/04817* (2013.01);
(Continued)

(58) Field of Classification Search
CPC ...... G06F 17/212; G06F 17/21; G06F 40/103; G06F 40/106; G06F 40/177; G06F 40/18;
(Continued)

(56) References Cited

U.S. PATENT DOCUMENTS 5,093,907 A    3/1992  Hwong et al.
5,247,611 A    3/1993  Norden-Paul
(Continued)

FOREIGN PATENT DOCUMENTS

AU    2007221349 B2    5/2011
CA    2 617 870          5/2015
(Continued)

OTHER PUBLICATIONS

U.S. Appl. No. 14/981,303, Office Action dated Mar. 10, 2017, 19 pgs.
(Continued)

*Primary Examiner* — Kavita Stanley
*Assistant Examiner* — Tionna M Burke
(74) *Attorney, Agent, or Firm* — NovoTechIP International PLLC (57) ABSTRACT

Variable formatting for cells in computer spreadsheets, tables, and other documents is provided. For a selected range of cells, cell formats vary with the value in each cell (or an associated value). Formats can include color-scale backgrounds, in-cell elements (e.g., icons and data bars), and other cell formats that can be varied with a value.

20 Claims, 9 Drawing Sheets

Related U.S. Application Data continuation of application No. 12/547,760, filed on Aug. 26, 2009, now Pat. No. 8,286,072, which is a continuation of application No. 11/260,520, filed on Oct. 27, 2005, now Pat. No. 7,627,812.

(51) Int. Cl.
*G06F 40/106* (2020.01)
*G06F 40/177* (2020.01)
*G06F 3/04817* (2022.01)
*G06F 3/0482* (2013.01)
*G06F 3/04847* (2022.01)

(52) U.S. Cl.
CPC ........ *G06F 3/04847* (2013.01); *G06F 40/106* (2020.01); *G06F 40/177* (2020.01); *G06F 40/18* (2020.01)

(58) Field of Classification Search
CPC . G06F 3/04817; G06F 3/0482; G06F 3/04847
USPC ........................................................ 715/215
See application file for complete search history.

(56) References Cited

U.S. PATENT DOCUMENTS

| | | | |
|---|---|---|---|
| 5,255,363 A | 10/1993 | Seyler | |
| 5,381,517 A | 1/1995 | Thorndike | |
| 5,455,903 A | 10/1995 | Jolissaint et al. | |
| 5,485,618 A | 1/1996 | Smith | |
| 5,566,291 A | 10/1996 | Boulton et al. | |
| 5,566,330 A | 10/1996 | Sheffield | |
| 5,598,519 A | 1/1997 | Narayanan | |
| 5,604,854 A | 2/1997 | Glassey | |
| 5,632,009 A | 5/1997 | Rao et al. | |
| 5,787,411 A | 7/1998 | Groff et al. | |
| 5,883,635 A | 3/1999 | Rao et al. | |
| 5,966,716 A | 10/1999 | Comer et al. | |
| 6,026,397 A | 2/2000 | Sheppard | |
| 6,078,924 A | 6/2000 | Ainsbury et al. | |
| 6,085,202 A | 7/2000 | Rao et al. | |
| 6,185,582 B1 | 2/2001 | Zellweger | |
| 6,205,675 B1 | 3/2001 | Ide | |
| 6,246,410 B1 | 6/2001 | Bergeron et al. | |
| 6,279,016 B1 | 8/2001 | De Vorchik et al. | |
| 6,349,315 B1 * | 2/2002 | Sonoyama | G06F 17/211 715/209 |
| 6,411,313 B1 | 6/2002 | Conlon et al. | |
| 6,429,868 B1 | 8/2002 | Dehner et al. | |
| 6,453,270 B1 | 9/2002 | Durbin | |
| 6,496,832 B2 | 12/2002 | Chi et al. | |
| 6,507,836 B1 | 1/2003 | Nose et al. | |
| 6,535,883 B1 | 3/2003 | Lee et al. | |
| 6,549,894 B1 | 4/2003 | Simpson et al. | |
| 6,604,095 B1 | 8/2003 | Cesare et al. | |
| 6,626,959 B1 | 9/2003 | Moise et al. | |
| 6,659,626 B1 | 12/2003 | Markey | |
| 6,757,867 B2 | 6/2004 | Bauchot | |
| 6,829,615 B2 | 12/2004 | Schirmer et al. | |
| 6,839,719 B2 | 1/2005 | Wallace | |
| 6,851,088 B1 | 2/2005 | Conner et al. | |
| 6,854,103 B2 | 2/2005 | Teene | |
| 6,867,788 B1 | 3/2005 | Takeda | |
| 6,906,717 B2 | 6/2005 | Couckuyt et al. | |
| 6,988,241 B1 | 1/2006 | Guttman et al. | |
| 7,073,133 B2 | 7/2006 | Hughes et al. | |
| 7,130,812 B1 | 10/2006 | Iyer et al. | |
| 7,143,339 B2 | 11/2006 | Weinberg et al. | |
| 7,188,169 B2 | 3/2007 | Buus et al. | |
| 7,363,306 B1 | 4/2008 | Hao et al. | |
| 7,370,047 B2 | 5/2008 | Gorman | |
| 7,480,675 B2 | 1/2009 | Folting et al. | |
| 7,627,552 B2 | 12/2009 | Moore et al. | |
| 7,627,812 B2 | 12/2009 | Chamberlain et al. | |
| 7,657,552 B2 | 2/2010 | Welcker et al. | |
| 7,770,100 B2 | 8/2010 | Chamberlain et al. | |
| 7,831,539 B2 | 11/2010 | Folting et al. | |
| 8,060,817 B2 | 11/2011 | Goldberg et al. | |
| 8,095,866 B2 | 1/2012 | Folting et al. | |
| 8,286,072 B2 | 10/2012 | Chamberlain et al. | |
| 8,601,383 B2 | 12/2013 | Folting et al. | |
| 8,914,717 B2 | 12/2014 | Chamberlain et al. | |
| 9,424,235 B2 | 8/2016 | Chamberlain et al. | |
| 9,959,267 B2 | 5/2018 | Folting et al. | |
| 2002/0010713 A1 | 1/2002 | Egilsson | |
| 2002/0013786 A1 | 1/2002 | Machalek | |
| 2002/0013789 A1 | 1/2002 | Okuno et al. | |
| 2002/0038217 A1 | 3/2002 | Young | |
| 2002/0049687 A1 | 4/2002 | Helsper | |
| 2002/0054141 A1 | 5/2002 | Yen et al. | |
| 2002/0059233 A1 | 5/2002 | Bauchot | |
| 2002/0078086 A1 | 6/2002 | Alden | |
| 2002/0116417 A1 | 8/2002 | Weinberg et al. | |
| 2002/0118192 A1 | 8/2002 | Couckuyt et al. | |
| 2002/0120604 A1 | 8/2002 | Labarge et al. | |
| 2002/0120664 A1 | 8/2002 | Horn | |
| 2002/0175948 A1 | 11/2002 | Nielsen et al. | |
| 2003/0030672 A1 | 2/2003 | Hughes et al. | |
| 2003/0225876 A1 | 12/2003 | Oliver | |
| 2004/0002827 A1 | 1/2004 | Iguchi | |
| 2004/0060001 A1 | 3/2004 | Coffen et al. | |
| 2004/0117731 A1 | 6/2004 | Blyashov | |
| 2004/0181507 A1 | 9/2004 | Megiddo et al. | |
| 2004/0205450 A1 * | 10/2004 | Hao | G06T 11/206 715/277 |
| 2004/0268237 A1 | 12/2004 | Jones et al. | |
| 2005/0039033 A1 | 2/2005 | Meyers et al. | |
| 2005/0071737 A1 | 3/2005 | Adendorff et al. | |
| 2005/0089223 A1 | 4/2005 | Krumm | |
| 2005/0125377 A1 | 6/2005 | Kotler et al. | |
| 2005/0154769 A1 | 7/2005 | Eckart | |
| 2005/0177789 A1 | 8/2005 | Abbar et al. | |
| 2005/0192825 A1 | 9/2005 | Cardno et al. | |
| 2005/0210001 A1 | 9/2005 | Lee | |
| 2005/0216831 A1 | 9/2005 | Guzik et al. | |
| 2006/0002608 A1 | 1/2006 | Haddon et al. | |
| 2006/0013455 A1 | 1/2006 | Watson et al. | |
| 2006/0074866 A1 | 4/2006 | Chamberlain | |
| 2006/0075328 A1 | 4/2006 | Becker et al. | |
| 2006/0095276 A1 | 5/2006 | Axelrod et al. | |
| 2006/0136808 A1 | 6/2006 | Chirilov | |
| 2006/0167704 A1 | 7/2006 | Nicholls | |
| 2006/0224568 A1 | 10/2006 | Debrito | |
| 2006/0287998 A1 | 12/2006 | Folting et al. | |
| 2007/0061369 A1 | 3/2007 | Folting et al. | |
| 2007/0061746 A1 | 3/2007 | Folting et al. | |
| 2007/0074130 A1 | 3/2007 | Folting et al. | |
| 2007/0101252 A1 | 5/2007 | Chamberlain et al. | |
| 2007/0174228 A1 | 7/2007 | Folting et al. | |
| 2007/0204212 A1 | 8/2007 | Chamberlain et al. | |
| 2010/0042913 A1 | 2/2010 | Chamberlain et al. | |
| 2010/0251090 A1 | 9/2010 | Chamberlain et al. | |
| 2012/0079363 A1 | 3/2012 | Folting et al. | |
| 2012/0324328 A1 | 12/2012 | Chamberlain et al. | |
| 2013/0132257 A1 * | 5/2013 | Zagara | G06Q 40/00 705/37 |
| 2014/0059412 A1 | 2/2014 | Folting et al. | |
| 2015/0100871 A1 | 4/2015 | Chamberlain et al. | |
| 2016/0110337 A1 | 4/2016 | Folting et al. | |
| 2017/0075874 A1 | 3/2017 | Folting et al. | |

FOREIGN PATENT DOCUMENTS

| | | |
|---|---|---|
| JP | 10-040050 | 2/1998 |
| JP | H11282941 A | 10/1999 |
| JP | 2001067489 | 3/2001 |
| JP | 2001-067486 | 6/2001 |
| JP | 2005-038404 | 2/2005 |
| JP | 2005-228345 | 8/2005 |
| KR | 10-2004-0027270 | 4/2004 |
| KR | 10-2004-0048786 | 6/2004 |
| KR | 10-2004-0106278 | 12/2004 |
| KR | 10-2005-0077048 | 8/2005 |
| KR | 10-2005-0081532 | 8/2005 |

(56) References Cited

FOREIGN PATENT DOCUMENTS

| | | |
|---|---|---|
| RU | 2005103645 A | 7/2006 |
| RU | 2 417 421 | 4/2011 |
| RU | 2 433 449 | 11/2011 |
| RU | 2 442 212 | 2/2012 |
| WO | 2000/073937 | 12/2000 |
| WO | 2002/063876 | 12/2000 |
| WO | 2007/032909 | 3/2007 |
| WO | 2007/032910 | 3/2007 |
| WO | 2007/032913 | 3/2007 |
| WO | 2007/100518 | 3/2007 |

OTHER PUBLICATIONS

Indian Hearing Notice in Indian Application 4383/CHENP/2008, dated Mar. 3, 2017, 3 pgs.
U.S. Appl. No. 14/570,501, Office Action dated Apr. 13, 2017, 20 pgs.
Halberg et al., "Special Edition Using Microsoft Excel 97", Best Seller Edition, Oct. 16, 1997, Que Publishing, pp. 139-141 and 913-915.
Baiter, "Allison Baiter's Mastering Microsoft® Office Access 2003"; Sams, Dec. 8, 2003; pp. 68-72.
Microsoft Office Assistance: Pivot Table reports 101; http://office.Microsoft.com/en-us/assistance/HA010346321033.aspx?mode=print, © 2005 Microsoft Corporation, 11 pages (printed Aug. 10, 2005).
Carlton Collins, Microsoft Business Solutions, Microsoft Excel Pivot Tables, "A Business Software Tip," http/www.microsoft.com/businesssolutions/excel_pivot_tables_Collins.mspx?pf=true, 13 pages, updated Jun. 3, 2005 (printed Aug. 10, 2005).
Data Palette, Wikipedia, Oct. 2007, 1 pg.
Fink, Keith; "Overview of PivotTables and PivotCharts in Microsoft Access 2002" dated Aug. 16, 2001, 44 pages.
Chi, et al., "A Spreadsheet Approach to Information Visualization", http://www2.parc.com/istl/projects/uir/pubs/items/UIR-1997-03-Chi-UIST97-Spreadsheet.pdf, 2 pgs.
Chi et al., "A Spreadsheet Approach to Information Visualization"; In Proceedings of IEEE Symposium on Information Visualization; Oct. 21, 1997; http://citeseerx.ist.psu.edu/viewdoc/download?doi=10.1.1.24.6964&rep=rep1&type=pdf; 11 pgs.
Chi, "Exploring Visual Representations", http://www-users.cs.umn.edu/~echi/papers/infovis97/spread/node18.html, Jul. 22, 1997.
Treinish, "A Function-Based Data Model for Visualization", http://researchweb.watson.ibm.com/people/l/lloydt/dm/function/dm_fn.htm.
Varshney, A., et al.; "FINESSE: A Financial Information Spreadsheet" Proceedings of the 1996 IEEE Symposium on Information Visualization Symposium, pp. 70-71.
"Spreadsheet Visual Analyzer ver. 1.0"; Download3000, ©2003-2004, http://www.download3000.com/download_12120.html; retrieved Jan. 2, 2006; 2 pgs.
Davenport, G.; "Numbers—A Medium That Counts" IEEE Computer Graphics & Applications 11(4):39-44, Jul. 1991.
Hallberg, B., et al.; Special Edition Using Microsoft Excel 97; Bestseller Edition; Oct. 16, 1997; Que Publishing; pp. 4, 10.
Person, R.; Special Edition Using Microsoft Excel 97; Dec. 17, 1996; Que Publishing; renumbered pp. 1-37.
Stinson et al., "Microsoft Office Excel 2003 Inside Out, Analysing Data with Pivot Table Reports"; Microsoft Office Excel 2003 Inside Out, Microsoft Press, Jan. 1, 2003; pp. 797-807.
Desmaris; "Using the Microsoft Pivot Table for Reliability Applications"; IEEE Annual Reliability Symposium; Reliability-Investing in the Future; Apr. 18, 1996; pp. 1-13.
Nakano; "Excel Function Cooking"; Nikkei Personal Computing, No. 460, pp. 201-204; Nikkei Business Publications, Inc.; Japan; Jun. 21, 2004, 8 pgs.
Kimura; "Even if the Content is the Same; it Can Be Shown in Various Ways; Important Points for Utilizing Excel 'Display Format'"; Nikkei PC 21, vol. 11, No. 3, pp. 72-73, Nikkei Business Publications Inc.; Japan, Feb. 1, 2006, 6 pgs.
Dictionary.com, LLC; "Spreadsheet"; Jul. 16, 2012, p. 1, Copyright 2012; Available World Wide Web "http://dictionary.reference.com/browse/spreadsheet?s=t", 3 pgs.
Protest Email "Microsoft patents same spreadsheet idea TWICE"; Oct. 10, 2012; Patnews@ns1.patenting-art.com; 5 pgs.
Wikipedia; "Choropoleth map"; accessed Nov. 11, 2012 at http://en.wikipedia.org/wiki/Chropleth_map; 4 pgs.
Slashdot.org; "Microsoft Patents 1826 Choropleth Map Technique"; Sep. 10, 2012; accessed Nov. 10, 2012 at http://yro.slashdot.org/story/12/10/09/2055240/microsoft-patents-1826-choropleth-map-technique; 27 pgs.
Anonymous; "Conditional Formatting"; Internet Citation, Aug. 3, 2004, Retrieved from: http://web.archive.org/web/20040803153634/http://www.cpearson.com/excel/cformatting.htm; retrieved May 28, 2008; 4 pgs.
Stein J.D.; "Spreadsheet Smarts"; Internet Citation, 2000, Retrieved from Internet: http://www/aicpa.org/pubs/jofa/jan2000/stein.htm; retrieved May 28, 2008; 4 pgs.
Abramovich, S. et al., "Spreadsheet Conditional Formatting: An Untapped Resource for Mathematics Education"; Internet Citation, Oct. 5, 2005; Retrieved from Internet: http://epublications.bond.edu.au/ejsie/vol1/iss2/3/; 24 pgs.
Scott et al., "PivotTable and PivotChart Reports, & Macros in Microsoft Excel"; Biostatistician III, Department of BiostatisticsVanderbilt University; https://www.mc.vanderbilt.edu/gcrc/workshop_files/2008-02-22.pdf; 20 pgs.
Singleton; OpenOffice.org User Guide for Version 1.1.x; http://www.openoffice.org/documentation/manuals/OOo1_.x.x/user_guide.pdf; OpenOffice.org User Guide, 1.5; First Edition May 7, 2004; 441 pgs.
"Quattro Pro 9"; In Quattro Pro 9; Copyright© Corel Corporation and Corel Corporation Limited; http://www.ci.kinston.nc.us/pdfs/qp9en.pdf; 794 pgs.
Stolte et al., "Polaris: A System for Query, Analysis, and Visualization of Multidimensional Relational Databases"; In Proceedings of IEEE Transactions on Visualization and Computer Graphics, vol. 8, No. 1; Jan. 2002; http://graphics.stanford.edu/papers/polaris_extended/polaris.pdf; 14 pgs.
Canadian Examiner's Report dated Mar. 24, 2015 in Appln No. 2,836,444, 5 pgs.
Canadian Notice of Allowace dated May 8, 2014 in Appln No. 2,617,866, 2 pgs.
Canadian Notice of Allowance dated Apr. 3, 2014 in Appln No. 2,618,224, 2 pgs.
Canadian OA dated Aug. 2, 2013 cited in Appln No. 2,636,674, 3 pgs.
Canadian OA dated Dec. 23, 2013 cited in Appln No. 2,617,866, 2 pgs.
Canadian Office Action dated Aug. 7, 2014 in Appln No. 2,617,870, 2 pgs.
Canadian Office Action dated Dec. 18, 2014 in Appln No. 2,617,866, 4 pgs.
Canadian Office Action dated May 10, 2012 in Appln No. 2617870, 5 pgs.
Chinese Office Action dated Aug. 14, 2009 in Appln No. 200680032790.5, 11 pgs.
Chinese Office Action dated Aug. 21, 2009 in Appln No. 200780006781.3, 8 pgs.
Chinese Office Action dated May 14, 2010 in Appln No. 20068003172.2, 11 pgs.
Chinese Office Action dated Oct. 23, 2009 in Appln No. 200680032784.X, 7 pgs.
Chinese Second Office Action dated Jul. 30, 2010 in Appln No. 200680032790.5, 6 pgs.
Chinese Second Office Action dated May 6, 2010 in Appln No. 200680032784.X, 6 pgs.
EP Communication dated Jul. 22, 2014 in Appln No. 06 790 086.0, 5 pgs.
EP Communication dated Mar. 9, 2015 in Appln No. 14003694.8, 6 pgs.

(56) References Cited

OTHER PUBLICATIONS

EP Notice of Allowance Issued in Patent Application No. 06790086.0, dated Jul. 23, 2015, 7 Pages.
EP Search Report dated Feb. 10, 2014 in Appln No. PCT/US2007/004131, 7 pgs.
EP Search Report dated Jul. 20, 2009, Appln No. 06813959.1, 7 pgs.
EP Search Report dated Nov. 17, 2008, Appln No. 06790086.0, 6 pgs.
European Examination Report dated Oct. 23, 2012 in EP 56695RK900kap, 4 pgs.
European Extended Search Report dated Dec. 27, 2011, Appln No. 06802599.8, 7 pgs.
India Examination Report dated Aug. 6, 2015 in 1947/DELNP/2008, 2 pgs.
India First Examination Report dated Apr. 13, 2015 in 4383/CHENP/2008, 2 pgs.
India First Examination Report dated Sep. 29, 2015 in 1944/DELNP/2008, 2 pgs.
India First Examination Report dated Sep. 30, 2015 in 1983/DELNP/2008, 1 pg.
PCT International Search Report dated Jul. 27, 2007, issued in PCT Appl. No. PCT/US2007/004131.
Japanese Notice of Rejection dated Aug. 10, 2012 in Appln No. 2008-556365, 6 pgs.
Japanese Notice of Rejection dated Mar. 5, 2013 cited in Appln No. 2012-036529, 5 pgs.
Japanese Notice of Rejection dated Nov. 10, 2009 in Appln No. 2008-530101,4 pgs.
Japanese Notice of Rejection dated Nov. 18, 2011 in Appln No. 2008-530098, 4 pgs.
Japanese Notice of Rejection dated Nov. 29, 2011 in Appln No. 2008-556365, 6 pgs.
Japanese Notice of Rejection dated Nov. 7, 2013 in Appln No. 2012-044087, 6 pgs.
Japanese Notice of Rejection dated Oct. 12, 2012 in Appln No. 2008-530098, 5 pgs.
Japanese Notice of Rejection Issued in Japanese Patent Application No. 2008-530097, dated Oct. 12, 2012, 4 Pages.
Japanese Office Action Received in Patent Application No. 2012-044087, dated Mar. 18, 2014, Filed Date: Aug. 20, 2008, 5 Pages.
Korean Notice of Rejection dated Apr. 30, 2013 cited in Appln No. 10-2008-7005544, 8 pgs.
Korean Notice of Rejection dated Mar. 29, 2013 cited in Appln No. 10-2008-7020125, 4 pgs.
Malaysia Notice of Allowance Received in Patent Application No. PI 20082804, dated Sep. 13, 2013, Filed Date: Feb. 13, 2007, 2 Pages.
Malaysian Notice of Allowance Received for Malaysia Patent Application No. PI 20080501, dated Aug. 30, 2013, Filed Date: Aug. 29, 2006, 2 pgs.
Malaysian Substantive Examination Report dated Jan. 15, 2014 in Appln No. PI 20080498, 3 pgs.
Mexican Notice of Allowance dated Aug. 12, 2014 in Appln No. MX/a/2008/009869, 4 pgs.
Mexican Office Action with summary dated Apr. 25, 2012 in Appln No. MX/a/2008/003319, 13 pgs.
Norwegian Office Action and Search Report dated Feb. 10, 2015 in U.S. Appl. No. 20/080,639, 6 pgs.
Norwegian Office Action dated Aug. 12, 2015 in U.S. Appl. No. 20/080,639, 2 pgs.
PCT Search Report and Written Opinion dated Feb. 16, 2007, Appln No. PCT/US2006/033876, 10 pgs.
PCT Search Report dated Jan. 11, 2007, Appln No. PCT/US2006/033808, 3 pgs.
PCT Search Report dated Jan. 9, 2007, Appln No. PCT/US2006/033807, 3 pgs.
European Office Action in Application 07750931.3, dated Jun. 10, 2016, 7 pgs.
U.S. Official Action dated Oct. 24, 2007 cited in U.S. Appl. No. 11/333,895, 10 pgs.
U.S. Official Action dated Apr. 1, 2008 cited in U.S. Appl. No. 11/222,660, 11 pgs.
U.S. Official Action dated May 7, 2008 cited in U.S. Appl. No. 11/333,895, 11 pgs.
U.S. Official Action dated Dec. 24, 2008 cited in U.S. Appl. No. 11/223,631, 23 pgs.
U.S. Official Action dated Jan. 13, 2009 cited in U.S. Appl. No. 11/333,895, 17 pgs.
U.S. Official Action dated Mar. 4, 2009 cited in U.S. Appl. No. 11/260,520, 13 pgs.
U.S. Official Action dated Mar. 30, 2009 cited in U.S. Appl. No. 11/223,527, 33 pgs.
U.S. Official Action dated Aug. 5, 2009 cited in U.S. Appl. No. 11/223,631, 21 pgs.
U.S. Official Action dated Aug. 24, 2009 cited in U.S. Appl. No. 11/333,895, 18 pgs.
U.S. Official Action dated Aug. 25, 2009 cited in U.S. Appl. No. 11/364,377, 25 pgs.
U.S. Official Action dated Oct. 26, 2009 cited in U.S. Appl. No. 11/223,527, 38 pgs.
U.S. Official Action dated Dec. 14, 2009 cited in U.S. Appl. No. 11/223,631, 21 pgs.
U.S. Official Action dated Dec. 29, 2009 cited in U.S. Appl. No. 11/364,377, 19 pgs.
U.S. Official Action dated Dec. 31, 2009 cited in U.S. Appl. No. 11/333,895, 15 pgs.
U.S. Official Action dated Jun. 3, 2010 cited in U.S. Appl. No. 11/223,631, 21 pgs.
U.S. Official Action dated Jun. 22, 2010 cited in U.S. Appl. No. 11/223,527, 36 pgs.
U.S. Official Action dated Jul. 29, 2010 cited in U.S. Appl. No. 11/223,631, 18 pgs.
U.S. Official Action dated Aug. 12, 2010 cited in U.S. Appl. No. 11/333,895, 21 pgs.
U.S. Official Action dated Dec. 8, 2010 cited in U.S. Appl. No. 11/223,527, 39 pgs.
U.S. Official Action dated Dec. 27, 2010 cited in U.S. Appl. No. 11/223,631, 22 pgs.
U.S. Official Action dated Apr. 11, 2011 cited in U.S. Appl. No. 11/223,631, 21 pgs.
U.S. Official Action dated Apr. 13, 2011 cited in U.S. Appl. No. 11/223,527, 40 pgs.
U.S. Official Action dated Nov. 8, 2011 cited in U.S. Appl. No. 11/223,527, 41 pgs.
U.S. Official Action dated Mar. 19, 2012 cited in U.S. Appl. No. 12/794,876, 18 pgs.
U.S. Official Action dated Jul. 31, 2012 cited in U.S. Appl. No. 11/223,527, 48 pgs.
U.S. Official Action dated Aug. 15, 2012 cited in U.S. Appl. No. 12/794,876, 26 pgs.
U.S. Official Action dated May 9, 2013 cited in U.S. Appl. No. 12/794,876, 36 pgs.
U.S. Official Action dated Sep. 10, 2013 cited in U.S. Appl. No. 12/794,876, 24 pgs.
U.S. Official Action dated Apr. 7, 2014 cited in U.S. Appl. No. 12/794,876, 29 pgs.
U.S. Notice of Allowance dated Aug. 18, 2014 cited in U.S. Appl. No. 12/794,876, 23 pgs.
U.S. Official Action dated Dec. 3, 2014 cited in U.S. Appl. No. 13/595,791, 8 pgs.
U.S. Official Action dated May 1, 2015 cited in U.S. Appl. No. 13/595,791, 9 pgs.
U.S. Official Action dated May 15, 2015 cited in U.S. Appl. No. 13/311,736, 10 pgs.
Notice of Allowance dated Aug. 18, 2015 cited in U.S. Appl. No. 13/311,736, 12 pgs.
Notice of Allowance dated Aug. 19, 2015 cited in U.S. Appl. No. 13/595,791, 9 pgs.
U.S. Appl. No. 14/068,294, Office Action dated Mar. 11, 2016, 37 pgs.
U.S. Appl. No. 13/595,791, Notice of Allowance dated Apr. 5, 2016, 7 pgs.

(56) References Cited

OTHER PUBLICATIONS

U.S. Appl. No. 13/595,791, Notice of Allowance dated May 24, 2016, 4 pgs.
U.S. Appl. No. 14/068,294, Notice of Allowance dated Aug. 5, 2016, 7 pgs.
U.S. Appl. No. 14/981,303, Office Action dated Nov. 8, 2016, 20 pgs.
Indian Hearing Notice in Application 1947/DELNP/2008, dated Oct. 28, 2016, 2 pgs.
Office Action Issued in European Patent Application No. 06790086.0, dated Jul. 22, 2014, 5 Pages.
Office Action Issued in European Patent Application No. 06802599.8, dated Oct. 23, 2012, 4 Pages.
Search Report Issued in European Patent Application No. 07750931.3, dated Feb. 10, 2014, 7 Page.
Notice of Allowance Action Issued in U.S. Appl. No. 11/260,520, dated Jul. 22, 2009, 9 Pages.
Notice of Allowance Action Issued in U.S. Appl. No. 11/260,520, dated Sep. 8, 2009, 15 Pages.
Non Final Office Action Issued in U.S. Appl. No. 12/547,760, dated Oct. 31, 2011, 16 Pages.
Notice of Allowance Action Issued in U.S. Appl. No. 12/547,760, dated Dec. 12, 2011, 8 Pages.
Notice of Allowance Action Issued in U.S. Appl. No. 12/547,760, dated Feb. 17, 2012, 8 Pages.
Notice of Allowance Action Issued in U.S. Appl. No. 12/547,760, dated May 10, 2012, 8 Pages.
Office Action Issued in Canadian Patent Application No. 2617870, dated Aug. 7, 2014, 2 Pages.
Indian Refusal Decision on Hearing in Application 1947/DELNP/2008, dated Dec. 7, 2016, 2 pgs. (English translation).
European Office Action Issued in European Patent Application No. 06790086.0, dated Feb. 24, 2009, 4 Pages.
U.S. Appl. No. 11/223,527, Notice of Allowance dated Jun. 14, 2013, 9 Pages.
Australian Notice of Allowance Issued in Australian Patent Application No. 2006291315, dated Feb. 7, 2011, 3 Pages.
Australian Office Action Issued in Australian Patent Application No. 2006291315, dated Nov. 3, 2010, 8 Pages.
Chinese Notice of Allowance Issued in Chinese Patent Application No. 200680032790.5, dated Mar. 8, 2011, 4 Pages.
Russian Notice of Allowance Issued in Russian Patent Application No. 2008109008, dated Aug. 11, 2011, 15 Pages.
Japanese Notice of Allowance Issued in Japanese Patent Application No. 2008-530097, dated Feb. 8, 2013, 6 Pages.
Japanese Office Action Issued in Japanese Patent Application No. 2008-530097, dated Nov. 22, 2011, 5 Pages.
Japanese Notice of Allowance Issued in Japanese Patent Application No. 2012-036529, dated Jul. 9, 2013, 6 Pages.
U.S. Appl. No. 14/981,303, Advisory Action dated May 19, 2017, 3 pgs.
U.S. Appl. No. 14/981,303, Notice of Allowance dated Dec. 26, 2017, 7 pgs.
U.S. Appl. No. 14/981,303, Notice of Allowance dated Jan. 10, 2018, 5 pgs.
European Summons to Attend Oral Proceedings in European Patent Application No. 06802599.8, Mailed Date: Jul. 27, 2017, 6 pages.
Indian Hearing Notice on Application 1944/DELNP/2008, dated Aug. 18, 2017, 2 pages.
U.S. Appl. No. 14/570,501, Office Action dated Jul. 28, 2017, 14 pgs.
"Office Action Issued in Malaysian Patent Application No. PI2013001495", dated Apr. 13, 2018, 3 Pages.
"Office Action Issued in Brazilian Patent Application No. PI0615459-0", dated Mar. 19, 2018, 6 Pages.
"Office Action Issued in Brazilian Patent Application No. PI0615570-7", dated Mar. 20, 2018, 7 Pages.
"Office Action Issued in Brazilian Patent Application No. PI0615650-9", dated Mar. 26, 2018, 6 Pages.
"Office Action Issued in European Application No. 06813959.1", dated Sep. 16, 2009, 6 Pages.
"Summon to Attend Oral Proceedings in European Application No. 06813959.1", Mailed Date: Nov. 14, 2012, 8 Pages.
"Office Action Issued in Korean Application No. 10-2008-7005688", dated Jan. 28, 2013, 4 Pages.
"Non Final Office Action Issued in U.S. Appl. No. 14/981,303", dated Jul. 14, 2017, 9 Pages.
"Office Action Issued in European Application No. 14003694.8", dated Jun. 7, 2018, 5 Pages.
"Office Action Issued in Australian Application No. 2007221349", dated Jan. 28, 2011, 2 Pages.
"Office Action Issued in Russian Application No. 2008109029", dated Jul. 1, 2010, 4 Pages.
"Office Action Issued in Russian Application No. 2008134884", dated Dec. 27, 2010, 4 Pages.
"Office Action Issued in Japanese Application No. 2012-044087", dated Aug. 27, 2013, 4 Pages.
Berliner, E. M.., et al., "Microsoft Office 2003", Binom-Express Publishing House, Feb. 24, 2004, p. 39-40, 120-124, 175-177, 233-234.
"Office Action Issued in Mexican Application No. MX/a/2008/003315", dated Jun. 21, 2010, 2 Pages. (W/O Translation).
"Office Action Issued in Brazilian Patent Application No. PI0708282-7", dated Aug. 7, 2018, 7 Pages.
"Office Action Issued in Malaysian Application No. PI20082804", dated Jan. 31, 2013, 3 Pages.
"Office Action Issued in Malaysian Patent Application No. PI2014700628", dated May 31, 2018, 3 Pages.
"Office Action Issued in Brazilian Patent Application No. PI0615650-9", dated Nov. 6, 2018, 18 Pages.
"Non Final Office Action Issued in U.S. Appl. No. 15/362,422", dated Feb. 6, 2019, 33 Pages.
"Oracle® Business Intelligence Discoverer Plus", Retrieved from http://www.maine.edu/pdf/psdsdpug.pdf, Nov. 2004, 614 Pages.
"Office Action Issued in European Patent Application No. 14003694.8", dated Apr. 30, 2020, 9 Pages.
"Office Action Issued in European Patent Application No. 14003694.8", dated Apr. 30, 2020, 9 Pages. (MS# 312952-EP-ETD).

\* cited by examiner

| A | 6 | 16 | 17 | 25 | 9 | 12 | 9 | 11 | 18 | 8 | 4 | 19 | 28 | 22 | 18 | |
|---|---|----|----|----|---|----|---|----|----|---|---|----|----|----|----|---|
|   | → | ⇧  | ⇧  | ←  | → | ⇧  | → | ⇧  | ⇧  | → | → | ⇧  | ←  | ←  | ⇧  |   |
| 1 | 2 | 3  | 4  | 5  | 6 | 7  | 8 | 9  | 10 | 11| 12| 13 | 14 | 15 | 16 |   |

FIG. 9

| A | 4 | 6 | 8 | 9 | 9 | 11 | 12 | 16 | 17 | 18 | 18 | 19 | 22 | 25 | 28 | |
|---|---|---|---|---|---|----|----|----|----|----|----|----|----|----|----|---|
| 1 | 2 | 3 | 4 | 5 | 6 | 7  | 8  | 9  | 10 | 11 | 12 | 13 | 14 | 15 | 16 |   |

VARIABLE FORMATTING OF VALUES

CROSS-REFERENCE TO RELATED APPLICATIONS

This application is a continuation of application Ser. No. 13/595,791, filed Aug. 27, 2012, which is a continuation of and claims priority under 35 U.S.C. § 120, to application Ser. No. 12/547,760, now U.S. Pat. No. 8,286,072, filed Aug. 26, 2009, entitled VARIABLE FORMATTING OF CELLS, which is a continuation of and claims priority to application Ser. No. 11/260,520, filed Oct. 27, 2005, entitled VARIABLE FORMATTING OF CELLS, now issued as U.S. Pat. No. 7,627,812, on Dec. 1, 2009, all which are hereby incorporated by reference in their entirety. To the extent appropriate, the present application claims priority to each of the above-referenced applications.

BACKGROUND

Data visualization techniques enable users of data to scan and quickly comprehend large quantities of information. Such techniques may also aid in alerting users to anomalies and other data of interest. Visualization tools can include charts, graphs, and reports that collect, summarize, and/or otherwise transform data into meaningful shapes, colors, and patterns. Closer to the source, data visualization has also included the use of conditional formatting in spreadsheets, which frequently serve as receptacles of raw data.

Figure 2:
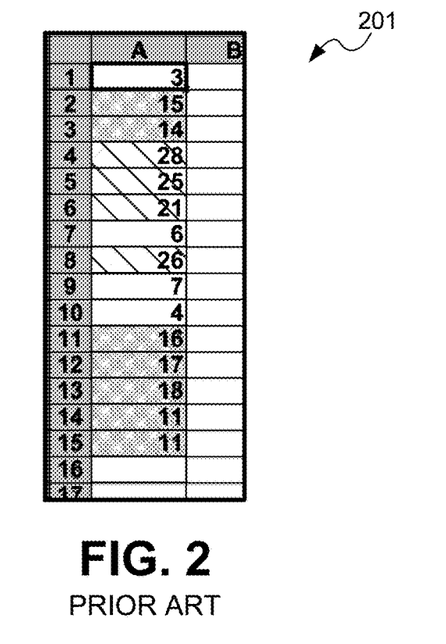
FIG. 2 depicts a prior art example of a range of conditionally formatted cells in a spreadsheet.

Conditional formatting has enabled users to modify the look of data in place, changing the appearance of individual spreadsheet or table cells based on the content of the cell (or some other determining condition). FIG. 2 depicts a prior art range of cells 201 in a spreadsheet, the cells of which have been conditionally formatted. Here, cell A1 provides an example of the default or unformatted version of a cell. Cell A2 provides an example of a first conditionally formatted cell, and cell A4 provides an example of a second conditionally formatted cell. Cells A2 and A4 have automatically received new formatting based on a condition associated with the cells.

Figure 3:
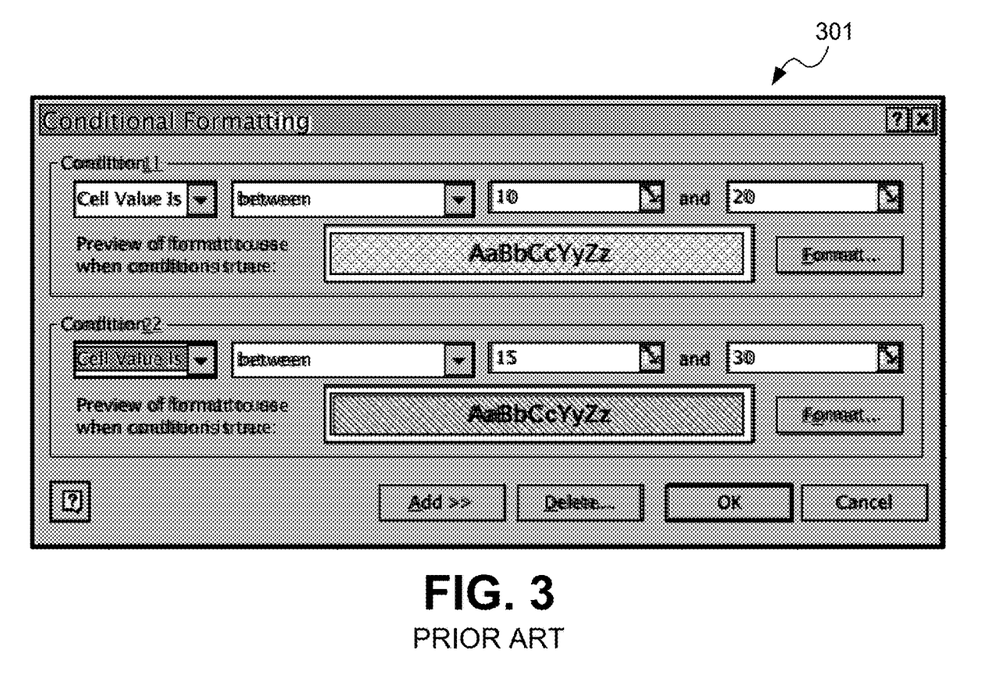
FIG. 3 depicts a prior art example of a dialog for conditionally formatting cells.

FIG. 3 depicts a prior art dialog 301 where formats conditioned upon values being within certain ranges have been selected. The two conditions supplied here (and applied to the range of cells 201) format cells in a particular fashion when the value contained within each is evaluated as being between a certain range (10 and 20 for condition 1, 15 and 30 for condition 2). The conditions utilized in conditional formats are limited to two possible Boolean outputs, TRUE or FALSE. If the condition supplied evaluates to TRUE, then the format is applied. If the condition supplied evaluates to FALSE, then the format is not applied.

Dialog 301 demonstrates that, while useful, conditional formatting can be limiting as to certain available formats (e.g., font, cell color, borders). Furthermore, a given range of cells is provided a maximum number of conditional formats that can be applied, certainly no more than three conditions, each providing no more than one possible format when evaluating to TRUE. These limitations prevent conditionally formatted cells from fully realizing their potential as analysis and reporting tools.

There is a need in the art for the ability to vary cell formats in tables and spreadsheets and to apply advanced formats. Such formatting should not be restricted to a limited set of formats based on Boolean conditions.

SUMMARY

One or more embodiments enable variable formatting, which provides methods for applying a varying format to a range of cells in a spreadsheet, table, or other electronic document. Formats are applied which vary based on the cell value (or an associated value). Examples include a variable format command being applied to a range of cells that varies the background color of the cell along a color scale varying with a value in the cell. Additional examples include varying the size (or other aspect) of a shape such as a data bar that is placed in the cell, and varying the selection of an in-cell icon based on a value associated with a cell.

Additional embodiments provide systems that may implement variable formatting, systems that include a display, processor, and memory storing instructions to execute on the processor.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

DETAILED DESCRIPTION

Formats need not be evaluated using only TRUE or FALSE as determinative results. Instead, cell formats applied can vary depending upon an associated value (e.g., the value in the cell itself), providing more formats which may be more meaningful to a user. Formats may be applied to a range of cells, where a format value is determined for each cell in the range, and one or more aspects of the format vary based on the format value. For example, as the value in a cell increases, the background color or shade is adjusted, or the size of an in-cell data bar grows, or the selection of an in-cell icon changes.

Figure 1:
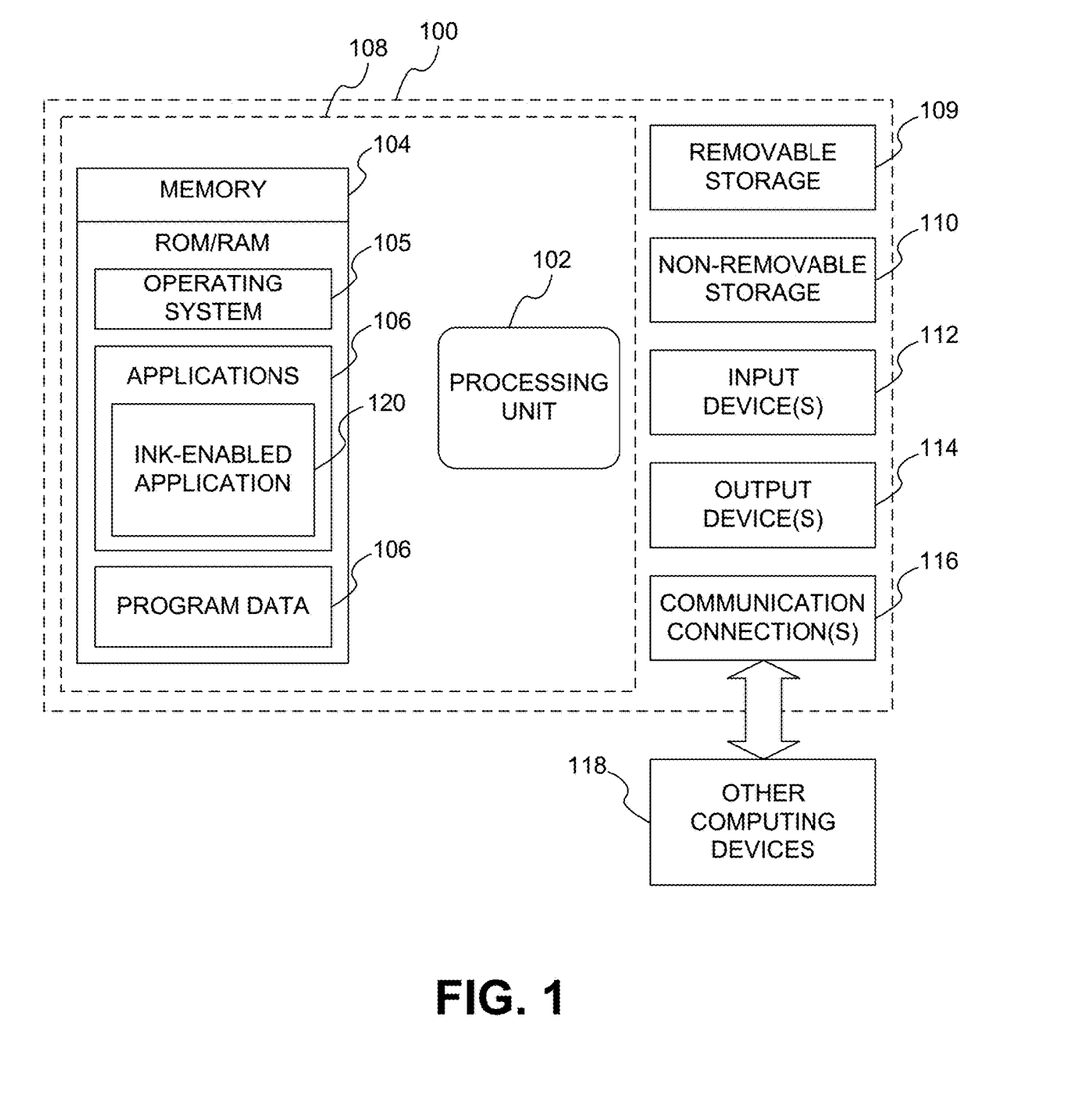
FIG. 1 depicts an exemplary operating environment in which one or more embodiments may be implemented.

FIG. 1 depicts an exemplary operating environment in which one or more embodiments may be implemented. The operating environment may comprise computing device 100 which may work alone or with other computing devices 118. Computing device 100 may comprise memory storage 104 coupled to processing unit 102. Any suitable combination of hardware, software, and/or firmware may be used to implement memory 104, processing unit 102 and other components. By way of example, memory 104, processing unit 102, and/or other components may be implemented within computing device 100 as shown, or may be implemented in combination with other computing devices 118. The systems, devices, and processors shown are used merely as examples.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, set-top boxes, and so forth. Embodiments may also be practiced in distributed computing environments where tasks are performed by other computing devices 118 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a computer program product or computer readable media. The computer program product may be a computer storage media readable by a computer system and encoded with a computer program of instructions for executing a process on computing device 100. The computer program product may also be a propagated signal on a carrier readable by a computing system and subsequently stored on a computer readable medium on computing device 100.

With reference to FIG. 1, the embodiment shown may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. Examples of operating system 105 are found in the family of WINDOWS operating systems from MICROSOFT CORPORATION of Redmond, Wash. In one embodiment, applications 106 may include a spreadsheet application 120.

Although the basic computing device configuration is contained within dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) keys, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 4A:
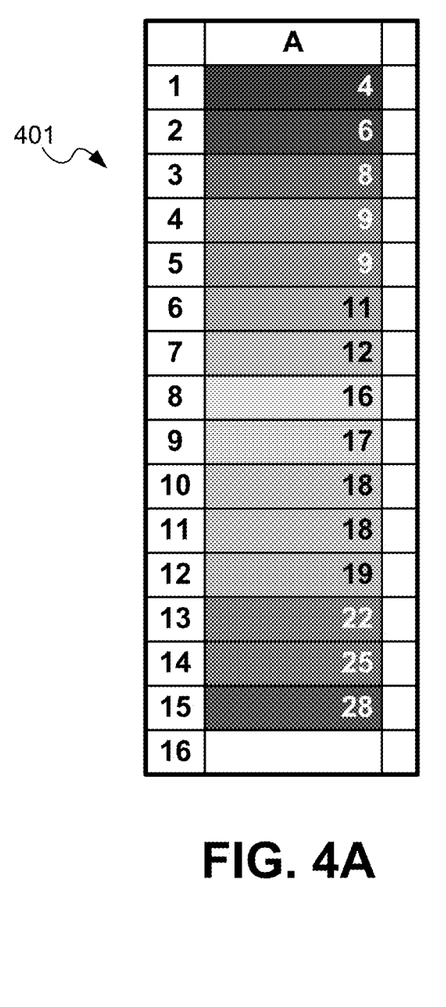
FIG. 4A depicts a range of cells formatted using color scale style variable formatting according to one or more embodiments.

FIG. 4A depicts a range of cells 401 formatted using color scale style variable formatting. Rather than being limited to three output formats (i.e. three conditions, one format each), the cells have a variable format applied that may produce any number of distinct cell formats. The cells within range 401 have values that are ordered from lowest to highest. Here, the value contained in each cell is used to determine a background color with which to fill the cell. Three colors are specified for the two endpoints and the midpoint, and the intervening colors are computed for values falling in between. The endpoint values within the range are held within cells A1 and A15. The background colors for each cell range from red (A1) to yellow (A8) to green (A15). Cells A2-A7 have background colors selected from a color scale between red and yellow, and cells A9-A14 have background colors selected from a color scale between yellow and green.

Figure 4B:
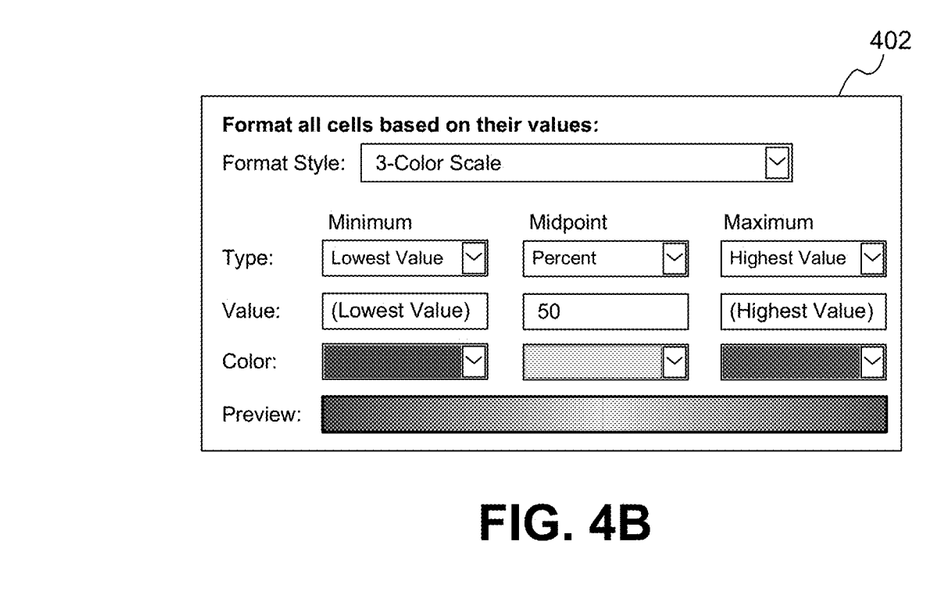
FIG. 4B depicts an input dialog with which a user may specify the variable formatting parameters for FIG. 4A according to one or more embodiments.

FIG. 4B depicts an input dialog 402 with which a user may specify the parameters of a variable format for cell range 401. Input dialog 402 may represent a portion of a larger dialog. When creating a variable format, a user may first select a range of cells such as cell range 401. The user may then request or command that a variable format be applied, causing dialog 402 to be displayed. The user may select a style of format, here "3-Color Scale." Once a style is selected, the appropriate input boxes allow a user to specify the parameters of the variable format to be applied.

For a 3-Color Scale, the input boxes allow a user to specify the method used to assign formats to cells in the range of cells. This is determined by using the Type pulldown for each of "Minimum," "Midpoint," and "Maximum." This pulldown may include choices including (but not limited to) "Lowest Value," "Highest Value," "Number," "Percent," "Percentile," and "Formula."

For "Lowest Value," which is only usable in the "Minimum" column, a program module will evaluate all of the values in the range of cells and select the lowest value as the Minimum, assigning the color selected beneath it. Likewise, "Highest Value," usable only with "Maximum," selects the cell with the highest value in the range, assigning the selected color beneath from the Maximum column.

For "Number," the user actually assigns the value that should receive the particular color associated with the particular column. If the user selects "Number," he or she enters the value to be associated in the input box below the pulldown. If the user selects "Number" for all three columns, then the values entered may be validated to, for example, ensure that the Minimum value is less than the Midpoint value, which is in turn less than the Maximum value.

For "Percent," the user enters a percent to associate with the color of the particular column. A program module may evaluate all of the values within the range of cells in order to determine what values to associate with the percentages entered. For example, if the values in the selected cells range from 0 to 200, then a Minimum value associated with "25%" would be 50. In this example, any cells having values less than 50 may be assigned the same background color as that assigned to Minimum.

"Percentile" differs from "Percent," in that it doesn't determine percentages within the range of values. Rather, "Percentile" examines the set of values contained in the cells, orders them, and uses their ordinality or position within the set of ordered values to determine their percentile. In a set of ten ordered cells, the 40th percentile would always be the fourth cell, regardless of the value contained within it. If a user selects "Percentile" and enters 40, then the cell at the 40th percentile will be assigned the associated color.

Finally, "Formula" allows a user to enter a formula into the Value input box. In most cases, the value used for formatting a cell is one and the same as the value in the cell. Here, however, a formula is evaluated to determine the value to be used for formatting purposes. The values derived from the formula for a range are then treated as the "Number" formatting type. A user may construct a formula using functions, cell references, operators, and so forth to arrive at a format value that is different from the cell value. As noted above, other types of values and algorithms may be used to allow a user to associate a cell range with particular formats.

Once a type is selected for each of the three points of interest, a value optionally entered, and a color selected, a user may push a button or otherwise issue the variable format command to apply it to the selected range of cells. Before accepting the command, a program module may validate the values entered in order to ensure that the Minimum value is less than the Midpoint value, which is less than the Maximum value. Such validation may not be possible until later, however, if values are not immediately known, such as when a formula is used.

Once a variable format is applied, making changes to the values in the selected range of cells may cause the formatting to be updated in some embodiments. If a value changes to become the new "lowest value," then all formatting may adjust appropriately. Likewise, if an additional cell is inserted into the range of cells, it may change the percentages, percentiles, formulas, etc. causing a program module to evaluate and possibly adjust the formats of cells in the range.

Figure 5A:
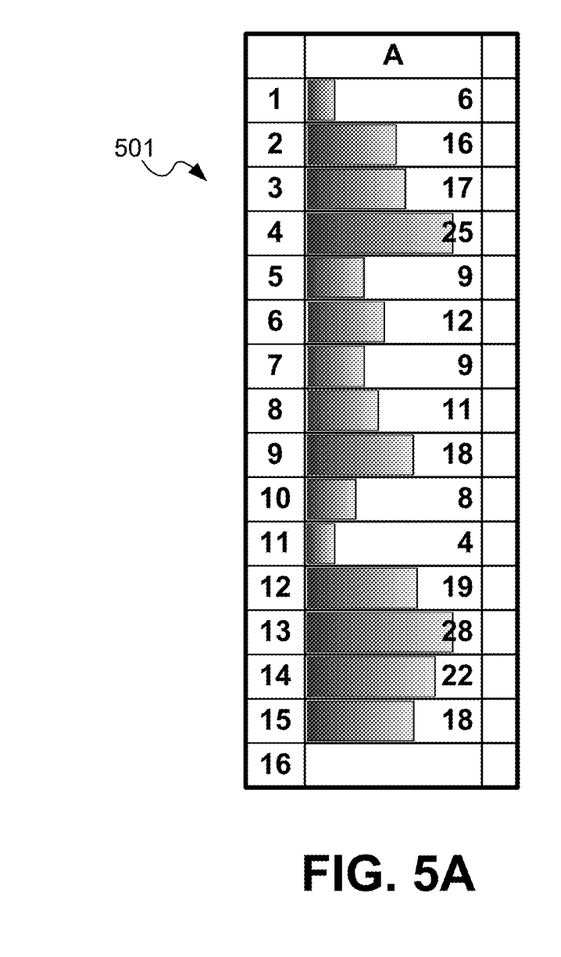
FIG. 5A depicts a range of cells formatted using data bar style variable formatting according to one or more embodiments.

FIG. 5A depicts a range of cells 501 formatted using data bar style variable formatting. Data bars may be depicted within cells and can provide a visual cue for users, indicating larger and smaller values in the range. The data bars within each cell have a length that is determined based on the value in the cell. For example cells A1 and A11 contain the shortest bars, corresponding to the values 6 and 4 respectively. Cells A4 and A13 have the longest bars, corresponding to the values 25 and 28 respectively. Although the data bars shown here are displayed as being filled with a color gradient, other types of data bars may be displayed, including solid bars, bars with patterns, and so forth.

In addition, although horizontal data bars are described here, other types of dynamically modified in-cell shapes may be used, each having an aspect modified depending upon the format value for the cell. Examples may include a pie with an automatically adjusting slice, a vertical data bar, and so forth. Furthermore, data bars may be combined with the color scales described above, such that the color of a bar changes based on the same format value, or possibly using a different format value (e.g., a formula) from the one used to determine the length of a bar.

Figure 5B:
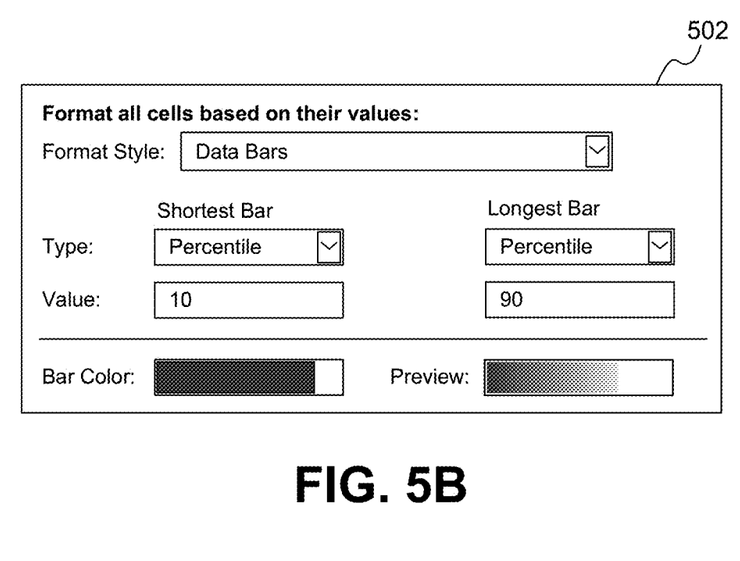
FIG. 5B depicts an input dialog with which a user may specify the variable formatting parameters for FIG. 5A according to one or more embodiments.

FIG. 5B depicts an input dialog 502 with which a user may specify the parameters of a variable format for cell range 501. Here, Data Bars have been selected as the format style for the range of cells 501. Dialog 502 enables a user to set the format values that will be assigned to the shortest and longest data bars. Furthermore, the dialog allows the user to manually set the color of the bars. As with dialog 402, upon entering the variable format command, some form of input validation may be performed.

Figure 6A:
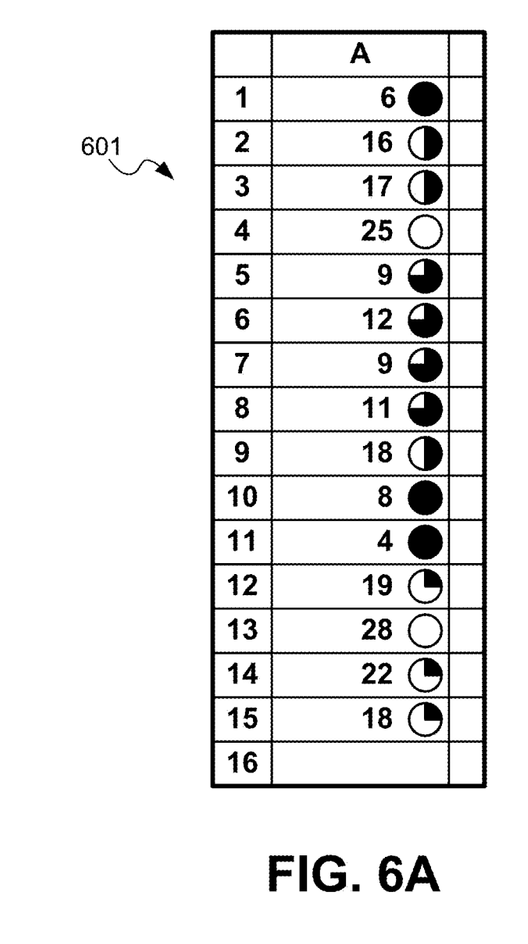
FIG. 6A depicts a range of cells formatted using icon style variable formatting according to one or more embodiments.

FIG. 6A depicts a range of cells 601 formatted using icon style variable formatting. Icons may be associated with subsets of the range of values associated with range of cells 601. Icons may come in groups of three, four, five, or more. Here, pie icons have been inserted by a program module into individual cells within the range of cells 601. The pie icons here, being a set of 5 distinct icons, differ from the adjustable sliced pie described above in that slices here are preset icons.

Figure 6B:
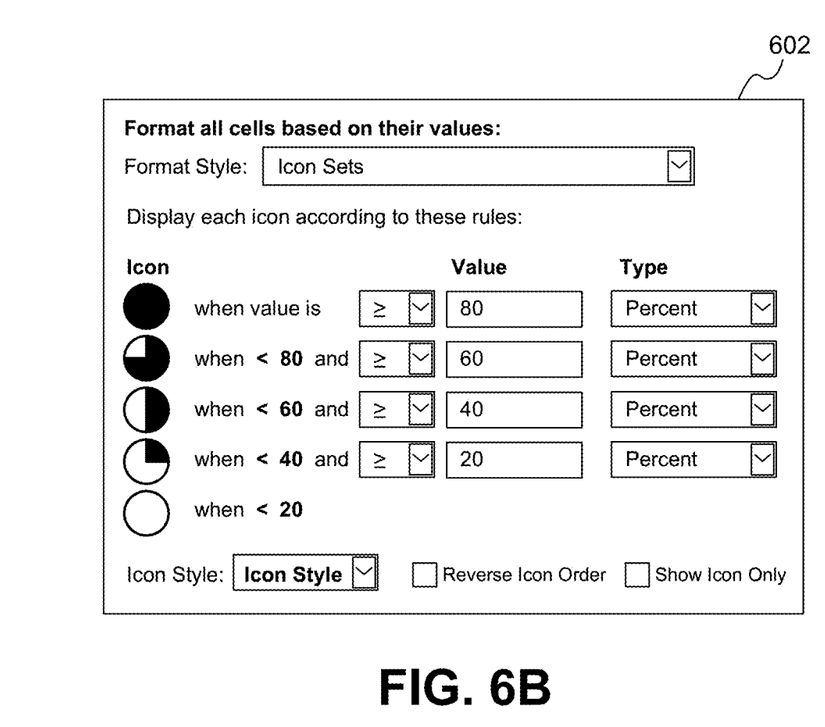
FIG. 6B depicts an input dialog with which a user may specify the variable formatting parameters for FIG. 6A according to one or more embodiments.

FIG. 6B depicts an input dialog 602 with which a user may specify the parameters of a variable format for cell range 601. The Format Style selected for cell range 601 is Icon Sets, allowing the user to select an Icon Set and apply value ranges for each of the icons. For each icon in the set, a user can assign a comparison operator (e.g., >, ≥, <, ≤), and select a Type of "Number," "Percent," "Percentile," or "Formula." In this fashion, the user assigns ranges of format values to each icon, and a program module can evaluate the format value and display the appropriate in-cell icon. Additional portions of the dialog may enable a user to modify the icon style, to reverse the icon order, and to replace a cell's value with the determined icon.

Figure 7A:
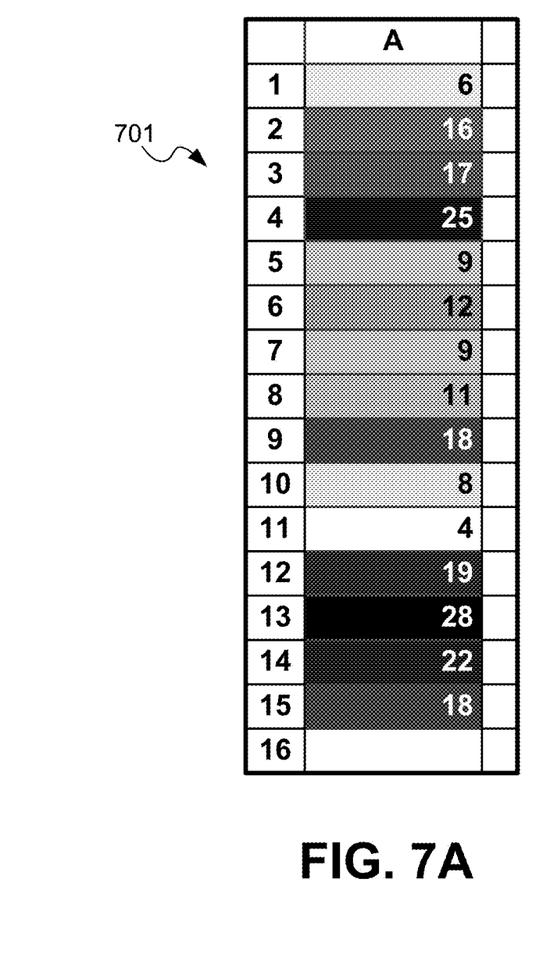
FIG. 7A depicts a range of cells formatted using another form of color scale style variable formatting according to one or more embodiments.
Figure 7B:
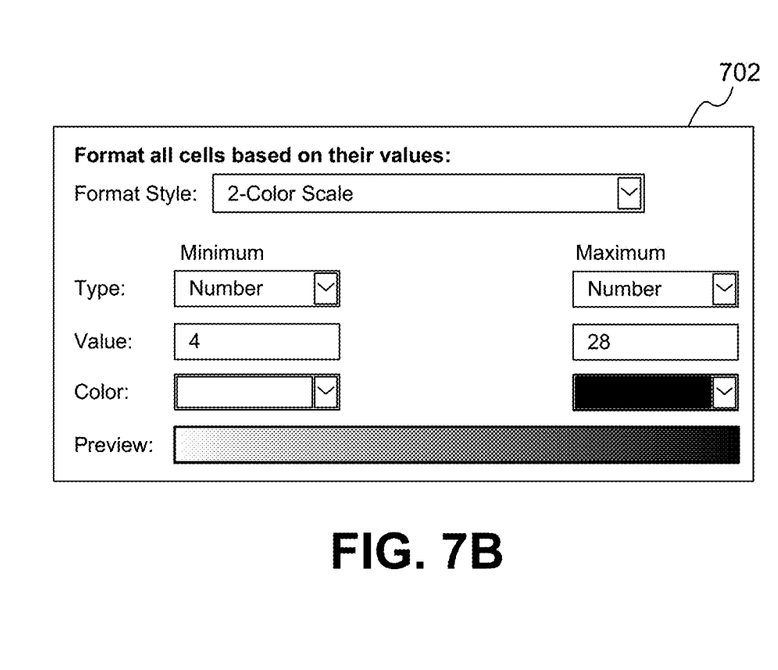
FIG. 7B depicts an input dialog with which a user may specify the variable formatting parameters for FIG. 7A according to one or more embodiments.

FIG. 7A depicts a range of cells 701 formatted using 2-color scale style variable formatting. The 2-color scale depicted works in the same fashion as the 3-color scale, except that no midpoint is provided. FIG. 7B depicts an input dialog 702 with which a user may specify the parameters of a variable format for cell range 701. This dialog again works similarly to dialog 402 described for the 3-color scale, the difference being the lack of a midpoint input.

Figure 8:
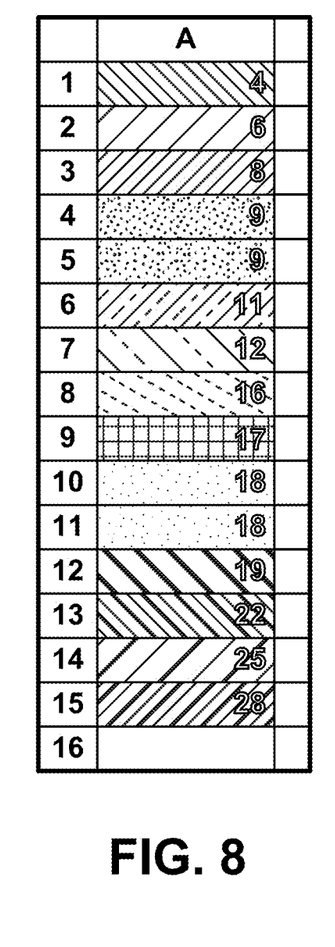
FIGS. 8 and 9 again present additional embodiments of variable formatting applied to cell ranges.
Figure 9:
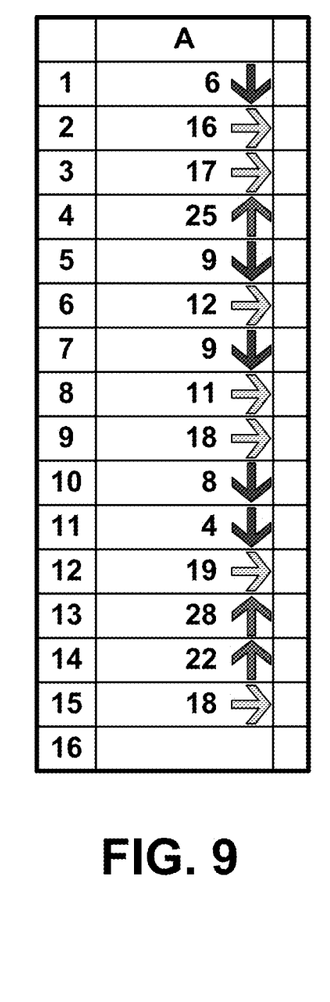

FIGS. 8 and 9 again present cell ranges 801 and 901 displaying cells formatted using additional embodiments. Cell range 801 has been formatted using pattern scales rather than color scales. Such patterns may simplify and enhance black and white printing of cells. Cell range 901 has been formatted using an alternate icon set, here arrow icons instead of pie icons.

Figure 10:
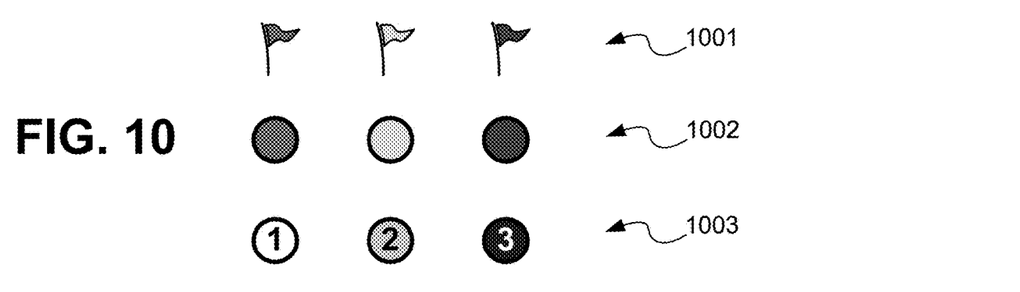
FIGS. 10-12 depict additional icon sets usable with icon style variable formatting according to one or more embodiments.
Figure 11:
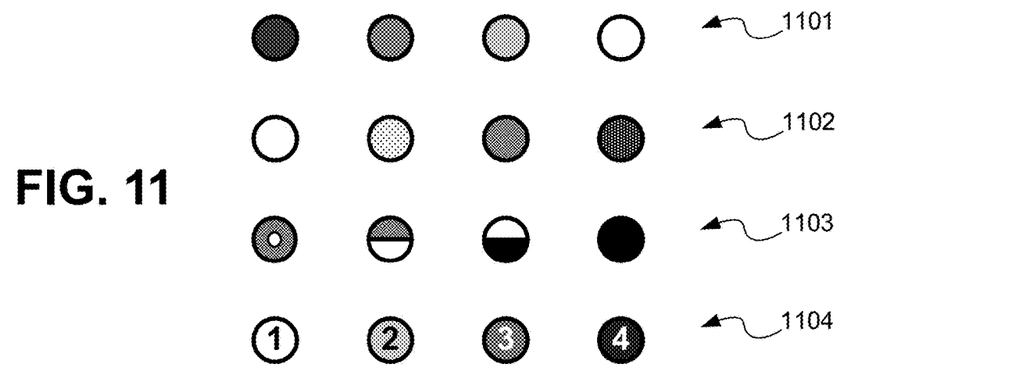
Figure 12:
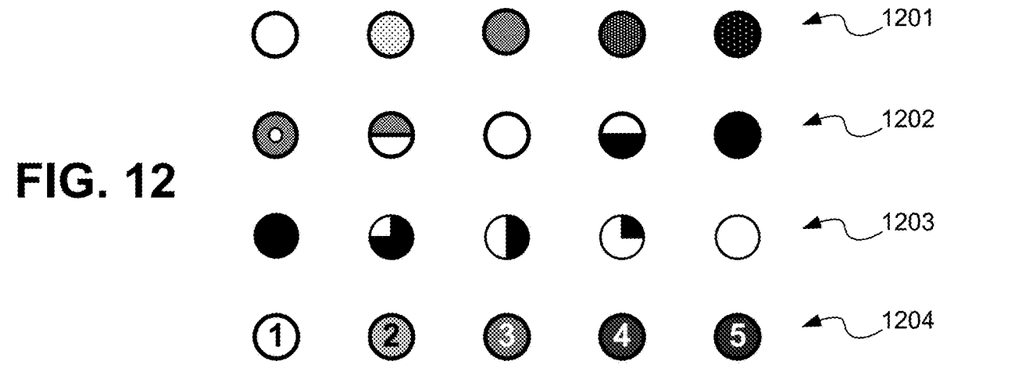

FIGS. 10-12 depict additional alternate icon sets that may be used with icon set style variable formatting. FIG. 10 depicts icon sets using three icons, including flags 1001, stoplights 1002, and digits 1003. FIG. 11 depicts icon sets using four icons, including shaded circles 1101, patterned circles 1102, rating circles 1103, and digits 1104. FIG. 12, finally, depicts icon sets having five icons, including patterned circles 1201, rating circles 1202, pie icons 1203 (previously described), and digits 1204. These icons merely represent additional examples of icon sets, and other icon sets may certainly be available. Moreover, icon sets having six or more icons are certainly possible. For icon sets fewer or greater than five, dialog 702 may simply be modified so as to add additional rows, including the additional icons and settings, or to remove rows as appropriate. Icon sizes may be adjusted along with the size of the cells in which they are to be applied.

Figure 13:
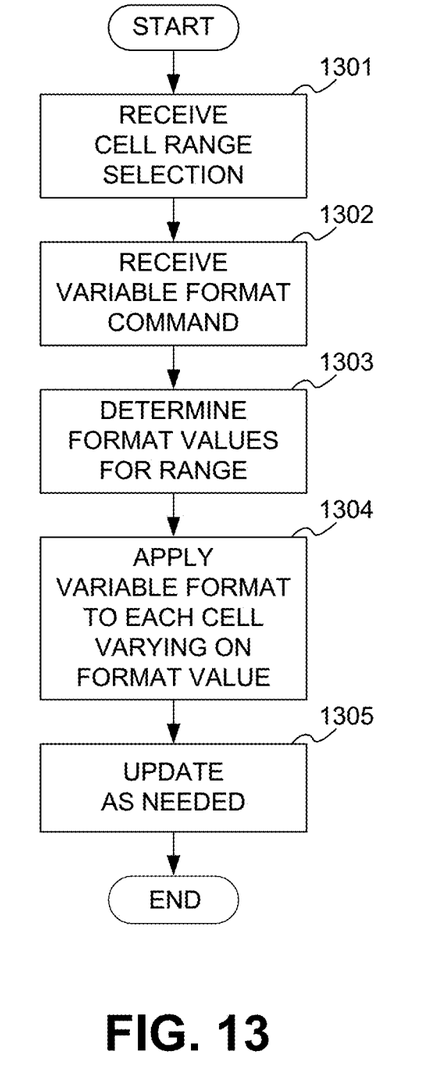
FIG. 13 is a flowchart depicting a method for applying a variable format to a range of cells according to one or more embodiments.

FIG. 13 is a flowchart depicting a method for applying a variable format to a range of cells. Initially, at step 1301, the selection of a range of cells is received. Next a variable format command is received at step 1302. Dialogs 402, 502, 602, and 702 present examples of visual interfaces that may be used to set the parameters associated with a variable format command. Such dialogs may perform simple parameter validations before issuing the command. At step 1303, the range of format values is determined for the range of cells. These values, in many cases, are simply the values stored in the cell, but may vary depending on the use of formulas. Depending on the type of method used to associate values with formats, determinations may be required to find certain percentages or percentiles within the range of format values. Certain formats for certain cells may require further calculations (e.g., selecting a color from a color scale, adjusting the length of a data bar, etc.) before proceeding. Once the formats are determined, they can be applied to each cell by selecting the format from a range of formats based on the format value. At step 1305, changes in the format values or other changes to the range of cells may require updates to cell formats.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings. For example, those skilled in the art will see that although the cells described throughout are associated with spreadsheet applications, other types of applications which display data in tabular format may take advantage of certain embodiments, including database applications, word processing applications, data reporting tools, and so forth.

We claim:

1. A method for displaying different visual indicators for different values, comprising:
    causing display of a graphical user interface (GUI) that presents options used to determine formatting for a range of values, comprising:
        causing display in the GUI of a style user interface element that is used to display multiple types of visual indicators and receive a selection of a type of visual indicator to apply to the range of values; and
        causing display in the GUI of formatting criteria user interface elements that are used to receive formatting criteria selections to apply to the type of visual indicator based on values in the range of values;
    receiving the formatting criteria selections, wherein the formatting criteria selections include a first format of the type of visual indicator correlated to a first value, and a second format of the type of visual indicator correlated to a second value;
    dynamically determining, based on receiving the first format and the second format, varying formats that vary in a spectrum from the first format to the second format;
    applying the varying formats to the selected type of visual indicator and values within the range of values; and
    causing display of the values after applying the selected type of visual indicator and the varying formats.

2. The method of claim 1, wherein the varying formats that vary in the spectrum comprise at least one member of a group comprising: a continuous spectrum of varying formats and an incremental spectrum of varying formats.

3. The method of claim 1, wherein the type of visual indicator comprises a color scale style and wherein the formatting criteria selections include: the first value that is assigned a first color; the second value that is assigned a second color, wherein the spectrum is a color spectrum ranging from the first color to the second color.

4. The method of claim 1, wherein the type of visual indicator comprises a data bar style, wherein the formatting criteria include: the first value being a first length of a data bar; the second value being a second length of a data bar, wherein the spectrum is a spectrum of lengths from the first length to the second length.

5. The method of claim 1, wherein the type of visual indicator comprises a pie chart icon format style, wherein the formatting criteria include: the first value being an empty pie chart; the second value being a full pie chart, wherein the spectrum is a spectrum of fill amounts from the empty pie chart to the full pie chart.

6. The method of claim 1, wherein the type of visual indicator comprises an arrow format style, wherein the formatting criteria include: the first value being a first direction format; the second value being a second direction format, wherein the spectrum is a spectrum of directions from the first direction format to the second direction format.

7. The method of claim 1, wherein the type of visual indicator comprises a flag set format style, wherein the formatting criteria include: the first value being a first flag format; the second value being a second flag format, wherein the spectrum is a spectrum of flags from the first flag format to the second flag format.

8. The method of claim 1, wherein the type of visual indicator comprises a circle set format style, wherein the formatting criteria include: the first value being a first circle format; the second value being a second circle format, wherein the spectrum is a spectrum of circles from the first circle format to the second circle format.

9. The method of claim 1, wherein the first value and the second value are at least one member of a group comprising: minima, maxima, numbers, percentages, percentiles, and formulas.

10. A computer-readable memory hardware having computer executable instructions for formatting a range of values according to a spectrum of formats, the instructions comprising:
    causing display of a graphical user interface for presenting formatting criteria for selection;

receiving formatting criteria selections for a range of values from the graphical user interface, wherein the formatting criteria selections include a first value format correlated to a first value, and a second value format correlated to a second value;

dynamically determining, based on receiving the first format and the second format, varying formats that vary in a spectrum from the first format to the second format;

determining whether a respective value for each value in the range of values is between the first value and the second value; and for each respective value between the first value and the second value, applying, to a display of each value, a respective format determined from a correlation of each respective value to a respective format in the spectrum of varying formats.

11. The computer-readable memory hardware of claim 10, wherein the spectrum of varying formats is at least one member of a group comprising: a continuous spectrum of varying formats and an incremental spectrum of varying formats and wherein the first value and the second value are at least one member of a group comprising: minima, maxima, numbers, percentages, percentiles, and formulas.

12. The computer-readable memory hardware of claim 10, wherein the formatting criteria includes a format color style, wherein the first value format is assigned a first color, wherein the second value format is assigned a second color, wherein the spectrum is a color spectrum from the first color to the second color.

13. The computer-readable memory hardware of claim 10, wherein the formatting criteria includes a data bar format style, wherein the first value format is a first length of a data bar, wherein the second value format is a second length of a data bar, wherein the spectrum is a spectrum of lengths from the first length to the second length.

14. The computer-readable memory hardware of claim 10, wherein the formatting criteria includes a pie chart icon format style, wherein the first value format is a first state of a pie chart, wherein the second value format is a second state of a pie chart, wherein the spectrum is a spectrum of fill amounts from the first state of the pie chart to the second state of the pie chart.

15. The computer-readable memory hardware of claim 10, wherein the formatting criteria includes an arrow format style, wherein the first value format is a first arrow, wherein the second value format is a second arrow, wherein the spectrum is a spectrum of arrow formats from the first arrow format to the second arrow format.

16. The computer-readable memory hardware of claim 10, wherein the formatting criteria includes a flag format style, wherein the first value format is a first flag, wherein the second value format is a second flag, wherein the spectrum is a spectrum of flags from the first flag to the second flag.

17. A system for formatting a range of values according to a spectrum of values, comprising:
a processor; and
a computer-readable medium having computer executable instructions stored thereon, wherein the computer executable instructions are configured for:
causing display of a graphical user interface for presenting formatting criteria for selection;
receiving formatting criteria selections for a range of values from the graphical user interface, wherein the formatting criteria selections include a first value format correlated to a first value, and a second value format correlated to a second value;
dynamically determining, based on receiving the first format and the second format, varying formats that vary in a spectrum from the first format to the second format;
determining whether a respective value for each value in the range of values is between the first value and the second value; and
for each respective value between the first value and the second value, applying, to a display of each value, a respective format determined from a correlation of each respective value to a respective format in the spectrum of varying formats.

18. The system of claim 17, wherein the spectrum of varying formats is at least one member of a group comprising: a continuous spectrum of varying formats and an incremental spectrum of varying formats and wherein the first value and the second value are at least one member of a group comprising: numbers, percentages, percentiles, and formulas.

19. The system of claim 17, wherein the graphical user interface displays a selection user interface element for selecting a type of style selected comprising three or more of: a format color style, a data bar format style, a pie chart format style, an arrow format style, a flag format style and a circle format style.

20. The system of claim 17, wherein the formatting criteria comprise assigning the first value format is a first state, wherein the second value format is assigned a second state, wherein the spectrum is a spectrum of states between the first state and the second state.

* * * * *